Sept. 27, 1955   R. H. GODDARD   2,718,899
QUICK-ACTING SHUT-OFF VALVE
Filed Dec. 8, 1951

INVENTOR.
ROBERT H. GODDARD, DEC'D.
ESTHER C. GODDARD, EXECUTRIX.
BY
Chas. T. Hawley
ATT'Y.

United States Patent Office 2,718,899
Patented Sept. 27, 1955

2,718,899

QUICK-ACTING SHUT-OFF VALVE

Robert H. Goddard, deceased, late of Annapolis, Md., by Esther C. Goddard, executrix, Worcester, Mass., assignor of one-half to The Daniel and Florence Guggenheim Foundation, New York, N. Y., a corporation of New York Application December 8, 1951, Serial No. 260,723

2 Claims. (Cl. 137—463)

This invention relates to a shut-off valve which is opened on application of pressure thereto and which is promptly closed on reduction of the pressure therein.

Such valves are capable of many uses and are particularly desirable for installation closely adjacent to combustion chambers in rocket apparatus. In such positions, they may be used to promptly end the flow of liquid combustion agents to the combustion chamber on a drop in feed pressure, instead of permitting flow to continue at gradually declining pressures.

It is the general object of the present invention to provide auxiliary means for immediately closing a shut-off valve on initial drop in pressure in the feed or supply pipe. In the preferred form, the auxiliary means releases a separate closure element.

The invention further relates to arrangements and combinations of parts which will be hereinafter described and more particularly pointed out in the appended claims.

A preferred form of the invention is shown in the drawings, in which

Figure 1:
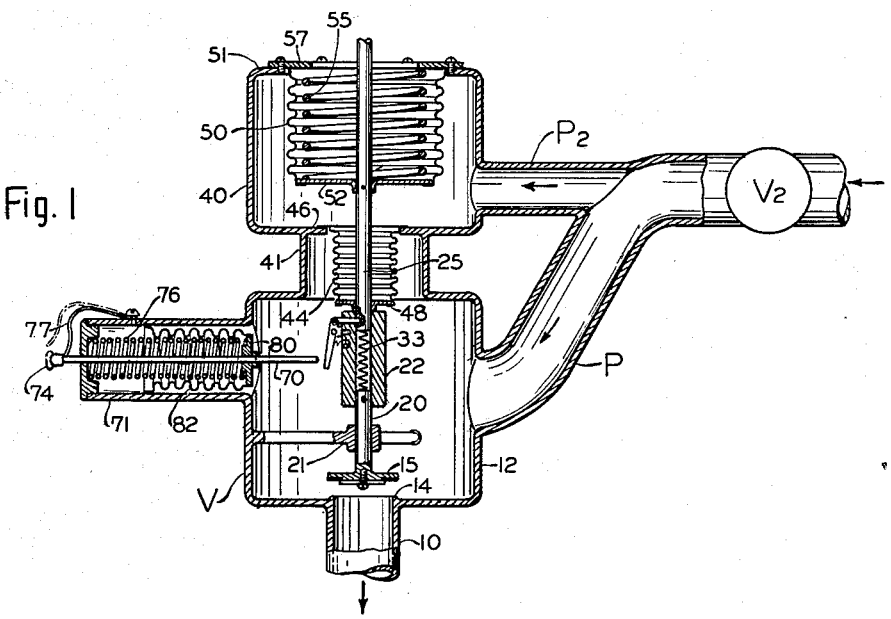
Fig. 1 is a sectional side elevation of the improved shut-off valve.

Referring to the drawings, a shut-off valve V is shown as interposed between a supply or feed pipe P and an outlet pipe 10 which may be connected to a combustion chamber or which may be used for any other desired purpose.

The valve V has a body or casing 12 and includes a valve seat 14 positioned for engagement by a valve plate or disc 15. The plate 15 is mounted at the lower end of a lower valve rod portion 20, slidable in a bearing spider 21 and having its upper end secured in a sleeve 22. An upper valve rod portion 25 is slidable in the sleeve 22 and is normally held therein by a cross-pin 30 which is seated in a recess 31 and the rod 25. A coil spring 33 is mounted in the sleeve 22 between the valve rod portions 20 and 25.

At its outer end, the cross-pin 30 has a pin-and-slot connection to a lever 35 pivoted at 36 in a stud 37 fixed in the sleeve 22. A spring 38 normally holds the cross-pin 30 seated in the recess 31.

An auxiliary casing 40 is mounted on an upward extension 41 of the valve body 12, and a bellows packing member 44 is loosely enclosed by the extension 41 and is secured at its upper end to the bottom plate 46 of the casing 40. The lower end of the bellows packing member 44 is secured to a disc 48, welded or otherwise secured to a lower part of the upper valve rod portion 25.

A valve-opening bellows 50 is mounted in the auxiliary casing 40 and has its upper end secured to an inwardly-projecting flange 51 of the casing 40. At its lower end, the bellows member 50 is secured to a disc 52, welded or otherwise secured to the upper valve rod portion 25.

A coil spring 55 is mounted within the bellows member 50 and engages the disc 52 at its lower end. At its upper end, the spring 55 is confined by an annular plate 57, removably mounted on the flange 51 of the casing 40. A branch pipe P2 connects the feed pipe P to the auxiliary casing 40, and the flow of fluid through the pipes P and P2 may be controlled by a hand valve V2.

Normally the valve V is closed by the spring 55 pressing downward on the disc 52 and moving the valve rod portion 25 and associated parts downward to seat the valve plate 15. As soon as the hand valve V2 is opened to admit fluid under pressure to the valve V, the same pressure will be exerted through the pipe P2 and in the casing 40 and will compress the bellows member 50.

The pressure thus exerted easily overcomes the relatively light pressure of the spring 55 and promptly raises the valve plate 15 to permit free flow to the outlet pipe 10. The parts will remain in this position so long as normal pressure is maintained in the pipes P and P2.

Special provision is made for releasing the valve plate 15 and permitting it to close very promptly on any substantial drop in pressure in the pipe P or valve V. For this purpose, a release rod 70 is slidably mounted in a lateral extension 71 of the valve casing 12. The rod 70 is provided with a shouldered head 74 and is normally held outward against the pressure of a spring 76 by a spring latch 77, which latch may be manually engaged under the shouldered head 74 as shown in full lines in Fig. 1.

The spring 76 is interposed between the outer end 78 of the casing extension 71 and a disc 80 mounted on an inner portion of the rod 70. A bellows member 82 is mounted inside of the extension 71 and is secured at its right-hand or inner end (as viewed in Fig. 1) to the plate or disc 80, and at its left-hand end to the inner wall of the extension 71.

Having described the details of construction of the improved valve, the manner of operation is as follows:

At the start of operations, the spring 55 forces the upper valve rod portion 25 downward into the sleeve 22 until it is latched by the cross-pin 30. The spring 55 then continues its downward pressure and seats the valve plate 15, thereby closing the valve V.

The release rod 70 may be manually drawn outward by its head 74, and the latch 77 will then be placed under the shoulder of the head 74, thus holding the rod 70 in outer or inoperative position.

Figure 2:
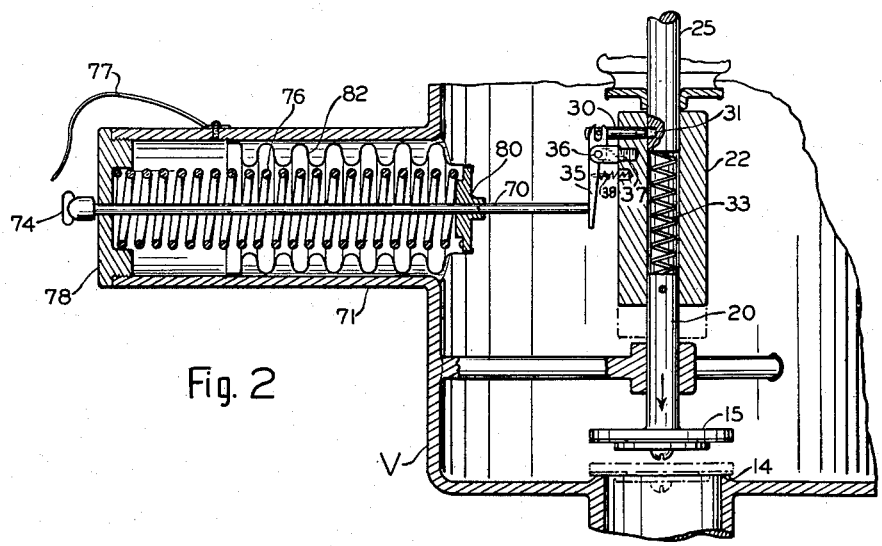
Fig. 2 is an enlarged side elevation of certain parts shown in Fig. 1.

As soon as the valve V2 is opened and substantial pressure is admitted to the valve V and auxiliary casing 40, the disc 15 will be raised by the operation of the bellows member 50. At the same time, the bellows member 82 in the extension 71 will be compressed and the rod 70 will be pushed to the left in Fig. 1 sufficiently to release the latch 77, as shown in Fig. 2.

As soon as the pressure in the pipes P and P2 thereafter begins to drop, due to closure of the valve V2 or for any other reason, the valve V will commence to close, but the closing movement will be relatively slow, owing to the large amount of fluid which must escape from the casing 40.

As soon, however, as the pressure commences to drop in the casing 12 of the valve V, the rod 70 is moved inward against the reduced pressure by its spring 76. The rod 70 then engages the lever 35 and withdraws the cross-pin 30.

The spring 33 (Fig. 2) within the sleeve 22 thereupon acts immediately to move the sleeve 22, the lower valve rod portion 20 and the valve plate 15 downward to abruptly close the valve V.

This takes place without waiting for the relatively slow action of the spring 55 in overcoming the remaining liquid pressure in the auxiliary casing 40. Much more prompt closing of the outlet pipe 10 is thus effected, and continued flow through the valve V at gradually falling pressure is prevented.

Having thus described the invention and the advantages thereof, it will be understood that the invention is not to be limited to the details herein disclosed, otherwise than as set forth in the claims, but what is claimed is:

1. In a shut-off valve, in combination, a body having an inlet, an outlet and a valve seat, a poppet-type valve member on the inlet side of the valve seat and axially movable to close said valve seat, means to open said valve which includes a two-part valve rod for said valve member, a connecting sleeve for said valve rod parts, one of said parts being fixed to the valve member and to the sleeve and the other part being slidable in the sleeve, a detachable connection between said slidable part and said sleeve, auxiliary means effective to release said detachable connection, and a spring compressed between the adjacent ends of the two-part valve rod and effective to accelerate seating of said valve member when said detachable connection is thus released, and said connection-releasing means being responsive to predetermined low pressure in said valve body and becoming operative to release the valve member for quick closing movement on the occurrence of said predetermined low pressure.

2. In a shut-off valve, in combination, a body having an inlet, an outlet and a valve seat, a poppet-type valve member on the inlet side of the valve seat and axially movable to close said valve seat, means to open said valve which includes a two-part valve rod for said valve member, a connecting sleeve for said valve rod parts, one of said parts being fixed to the valve member and to the sleeve and the other part being slidable in the sleeve, a detachable connection between said slidable part and said sleeve, means to release said detachable connection on reduction of pressure in said body and to permit a quick-closing movement of said valve member, and a spring in said sleeve between said two valve rod parts which is effective to accelerate the seating of said valve member when said detachable connection is released.

References Cited in the file of this patent

UNITED STATES PATENTS

| 755,265 | Wilke | Mar. 22, 1904 |
| 1,338,469 | Waage et al. | Apr. 27, 1920 |
| 1,927,609 | Markert | Sept. 19, 1933 |
| 2,127,293 | Gilman | Aug. 16, 1938 |
| 2,387,792 | Holmes | Oct. 30, 1945 |
| 2,402,036 | Giger | June 11, 1946 |